United States Patent [19]

Schneiter

[11] Patent Number: 5,568,260

[45] Date of Patent: Oct. 22, 1996

[54] PRECISION NON-CONTACT MEASUREMENT SYSTEM FOR CURVED WORKPIECES

[75] Inventor: John L. Schneiter, Latham, N.Y.

[73] Assignee: General Electric Company, Schenectady, N.Y.

[21] Appl. No.: 414,168

[22] Filed: Mar. 31, 1995

[51] Int. Cl.$^6$ ................................................. G01B 11/24
[52] U.S. Cl. .......................... 356/376; 356/375; 356/384; 250/559.19; 250/559.24
[58] Field of Search ...................................... 356/384, 376, 356/375; 250/559.19, 559.24

[56] References Cited

U.S. PATENT DOCUMENTS

| | | | |
|---|---|---|---|
| 4,576,482 | 3/1986 | Pryor | 356/384 |
| 4,832,496 | 5/1989 | Thomas | 356/384 |
| 4,882,497 | 11/1989 | Inoue et al. | 356/384 |
| 5,448,361 | 9/1995 | Patton | 356/384 |

*Primary Examiner*—Frank Gonzalez
*Assistant Examiner*—Reginald A. Ratliff
*Attorney, Agent, or Firm*—Donald S. Ingraham; Marvin Snyder

[57] ABSTRACT

A precision non-contact measurement system for determining the diameter of a curved workpiece includes a non-contact range sensor that is disposed along an orthogonal axial path with respect to the axis of rotation of a precision rotary device on which the workpiece to be measured is mounted so as to determine a radius value of the workpiece disposed along the orthogonal path, and a workpiece measurement processor coupled to receive signals from the range sensor and the precision rotary device so as to correlate a plurality of rotational positions of the workpiece with corresponding respective radius values sensed by the range sensor so as to determine the shape and an integrated diameter of the workpiece, that is a diameter measurement determined from rotation of the workpiece through a selected arc of rotation, typically 360°. The non-contact range sensors typically comprise optical sensors such as laser range sensors and light-emitting-diode (LED) type sensors. The precision rotary device commonly comprises a platen on which the workpiece is disposed and a signal generator for generating a signal corresponding to the rotation position of the workpiece throughout 360° of rotation.

16 Claims, 2 Drawing Sheets

PRECISION NON-CONTACT MEASUREMENT SYSTEM FOR CURVED WORKPIECES

BACKGROUND OF THE INVENTION

One quality control issue in manufacturing processes is making accurate quality assessments of the geometry of nominally circular symmetric parts. Geometrically accurate rounded parts are necessary components of rotating machinery such as turbines used in power generation or propulsion. Cumbustors, turbine casings, and the like have geometric shapes ranging from straight cylinders to complex circularly symmetric parts of irregular axial cross section. For quality control and assessment, it is required in the fabrication process to accurately measure part diameter (and whether the part conforms to the desired geometric shape) at any of a number of axial positions, and further to determine whether the part is concentric with the spin axis of a machine tool rotary stage.

Diameter measurements are commonly made with calibrated calipers that encircle the part (or workpiece) so as to come into contact with opposite side surfaces of the part. This process is often used even with large parts (such as a turbine rotor) and presents potential difficulties with respect to accuracy. For example, such a process is very dependent on the skill of the person making the measurement due to, for example, the flexing of the instrument when it comes in contact with the part being measured. Further, inaccuracies can arise because the measurement is made by the calipers at only one or a few angular positions around the part. Other measurement devices similarly require contact with the surface of the part to be measured, such as calibrated wheels that are held in contact with the workpiece as it is rotated through one revolution. Knowledge of the diameter of the calibrated wheel and the number of rotations enables one to determine the circumference and thence the diameter of the workpiece.

Another problem area is the potential deformation or damage to the part from measurement activities. Contact with the part (e.g., by either a calibrated-wheel type of device or a caliper) can lead to such deformation and damage, as can handling of the part to obtain the measurement with such contact devices.

For these reasons, among others, it is desirable to have a measurement system that can precisely measure the diameter of curved parts without the necessity of contacting the part.

SUMMARY OF THE INVENTION

A precision non-contact measurement system for determining the diameter of a curved workpiece includes a non-contact range sensor that is disposed along an orthogonal axial path with respect to the axis of rotation of a precision rotary device on which the workpiece to be measured is mounted so as to determine a radius value of the workpiece disposed along the orthogonal path, and a workpiece measurement processor coupled to receive signals from the range sensor and the precision rotary device so as to correlate a plurality of rotational positions of the workpiece with corresponding respective radius values sensed by the range sensor so as to determine an integrated diameter of the workpiece, that is, a diameter measurement determined from rotation of the workpiece through a selected arc of rotation, typically 360°. The workpiece measurement processor has a circuit adapted for determination of workpiece diameter in accordance with the following relation:

$$D_{int} = \left\{ \sum_i (R_i \Delta\theta) \right\} / \pi.$$

in which $D_{int}$ is the integrated diameter of the workpiece measured, "i" is the increment number of radius measurements made, R represents the respective radius values for each incremental rotation of the workpiece, and $\Delta\theta$ is the equiangular increment of rotation of the workpiece between each respective radius measurement. Alternatively, the non-contact measurement system is adapted to determine a plurality of respective workpiece surface positions by means of a radius/angular position data set as the workpiece is rotated so as to map the surface of the workpiece. The processor is adapted to generate vectors between sequential respective surface map points so as to provide a circumference value, which is used to determine the integrated diameter value.

The non-contact range sensors typically comprise optical sensors such as laser range sensors and light-emitting-diode (LED) type sensors. The precision rotary device commonly comprises a platen on which the workpiece is disposed and a signal generator for generating a signal corresponding to the rotation position of the workpiece throughout 360° of rotation.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description in conjunction with the accompanying drawings in which like characters represent like parts throughout the drawings, and in which:

DETAILED DESCRIPTION OF THE INVENTION

Figure 1:
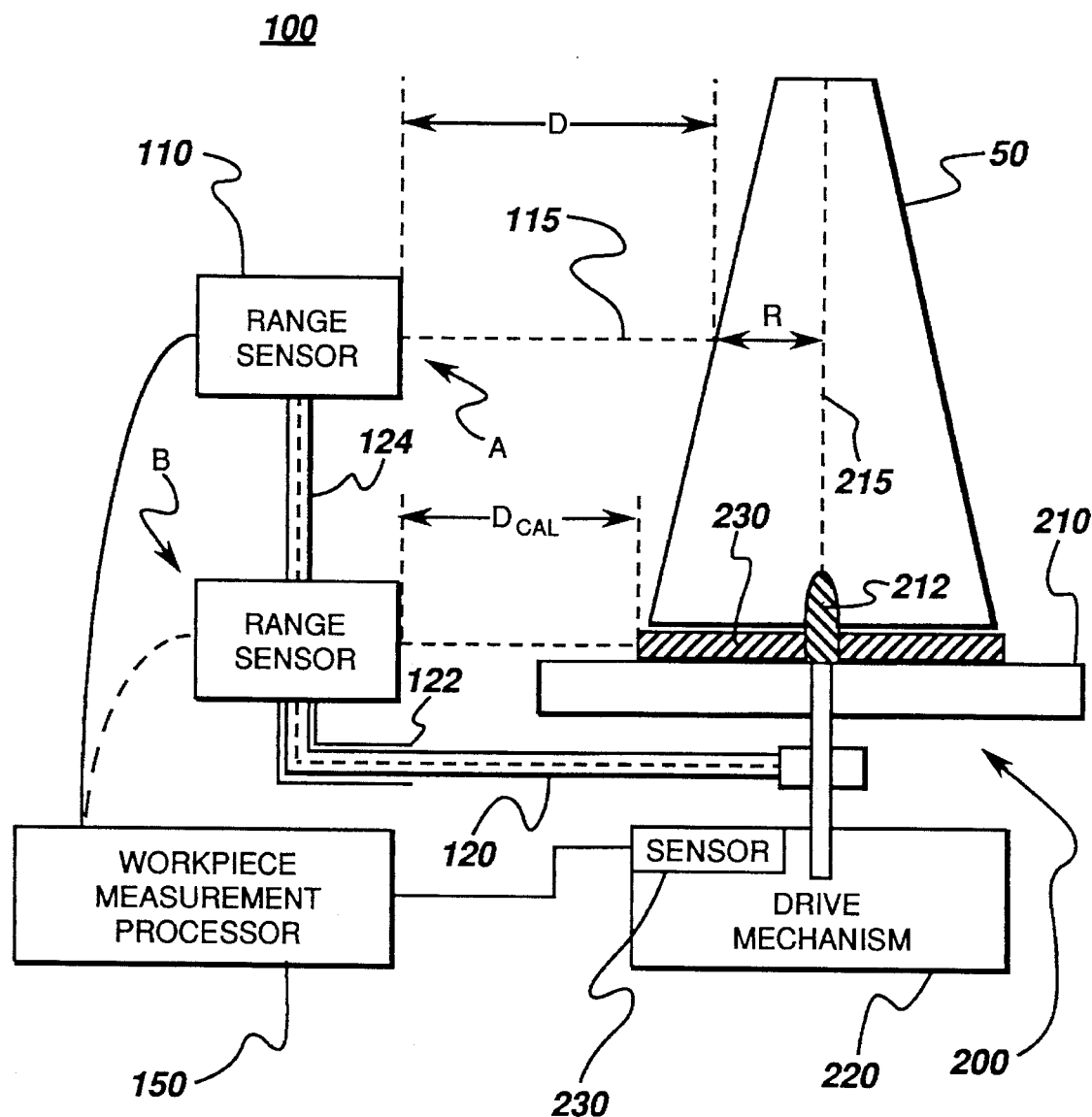
FIG. 1 is a block diagram representation of a precision non-contact measurement system in accordance with this invention.

A precision non-contact measurement system 100 for determining an integrated diameter of a workpiece 50 disposed on a precision rotary device 200 comprises a non-contact range sensor 110 and a workpiece measurement processor 150 as shown in FIG. 1. The workpiece measurement processor 150 is coupled to receive signals from range sensor 110 and precision rotary device 200 so as to correlate a plurality of rotational positions of the workpiece with corresponding radius values sensed by range sensor 110. As used herein, "integrated diameter" refers to a diameter value determined as a result of multiple radius measurements of workpiece 50 as it is rotated; the final diameter value represents an integration of multiple data points gathered from different points in a selected arc (typically 360°) around the circumference of the workpiece. The integrated diameter thus also provides information relating to the geometric shape of workpiece 50 as eccentricities in the shape result in an integrated diameter of a different value than would be obtained from a true circular shape.

Workpiece 50 is typically a part that is designed such that at least a portion of the part has a nominally circular geometric shape. Such parts may have the shape of a cylinder, a cone, or have complex circularly symmetric parts of irregular axial cross section. Thus, parts that are not completely circular (e.g., semicircular or the like) can also be measured with the apparatus of this invention. Common examples of parts on which accurate diameter measurements must be taken include combustor outer or inner linings and casings for turbines. By way of example and not limitation, workpiece 50 as illustrated in FIG. 1 comprises a cone-shaped part.

Precision rotary device 200 typically comprises a rotatable workpiece mounting platform 210 such as a platen or the like on which workpiece 50 is mounted so as to rotate in conjunction with platform 210. Platform 210 is coupled to a drive mechanism 220 such as an electric motor or the like that causes platform 210 to rotate about an axis of rotation 215 (shown as a dotted line in the Figure). Rotary device 200 is further coupled to workpiece measurement processor 150 so as to provide an electrical signal precisely corresponding to the rotational position of workpiece 50.

For example, workpiece 50 is mounted to platform 210 so that it is centered (that is, the circular portion of workpiece 50 to be measured is centered along axis of rotation 215) so that rotational movement of platform 210 results in a corresponding angular rotation of workpiece 50. By way of example and not limitation, platform 210 may further comprise a centering pin (or dowel) 212 disposed along platform axis of rotation 215 to assist in the centering of the workpiece on platform 210. Alternatively, mechanical guides (not shown) or optical alignment reference points on the workpiece and reference points on the platform can be used for centering. In the vertical orientation shown in the Figure, workpiece 50 is commonly placed on platform 210 and is not otherwise secured to the platform; alternatively, workpiece can be secured to platform 210 with bolts, straps, or the like, to allow operation of rotary device 200 with axis of rotation 215 oriented at some angle other than vertical.

Drive mechanism 220 comprises a position sensor 230 that provides an electrical signal that corresponds to the rotational position of workpiece 50 throughout the arc of rotation (typically 360°). As the rotational position of platform 210 corresponds to the rotational position of workpiece 50, sensor 230 is coupled to drive mechanism 220, or alternatively, to platform 210 (not shown) to generate a plurality of position signals corresponding to equiangular increments of rotation through 360° of rotation. Sensor 230 provides signals corresponding to at least one degree increments; as the precision of the integrated diameter measurement is enhanced with finer increments, commonly sensor 230 provides a position signal in equiangular increments of at least one-tenth degree.

Alternatively, precision rotary device 200 comprises machining equipment, such as a lathe, a rotary drilling apparatus, or the like on which workpiece 50 is mounted for the purpose of being formed in a desired shape with design dimensions. Such machining equipment is similarly adapted to rotate workpiece 50 about an axis of rotation and further comprises the rotational sensor 230 to generate signals providing precise information on the rotational position of workpiece 50. Use of machining equipment adapted to provide the precise rotational position signals to processor 150 can be advantageous because the ability to determine integrated diameter measurements, and subsequent conclusions drawn with regard to the geometric shape of workpiece 50, without the necessity of removing workpiece 50 from the machining equipment, save time required for removal, alignment on a separate rotary platform 210, and subsequent replacement and realignment of the workpiece on the machining equipment. In addition, the removal, measurement, and repositioning of workpieces presents a danger of damage to the part in handling after it is removed from supports on the machining equipment.

Non-contact range sensor 110 typically comprises an optical distance sensor such as a laser range sensor (such as a laser triangulation unit) or a light emitting diode (LED) type of sensor. As used herein, "non-contact" and the like refers to a range sensing device that does not come in physical contact with the surface (or other portion) of workpiece 50 in order to generate an output distance measurement signal that is supplied to processor 150. Range sensor 110 is disposed along an orthogonal axial path 115 with respect to the axis of rotation 215 of precision rotary device 200. This orthogonal path is thus always disposed perpendicular to axis of rotation 215 throughout the arc of rotation of platform 210 (tyically 360°); thus there is no "wobble" of platform 210 as it rotates through 360°. Workpiece 50 is thus aligned along axis of rotation 215 throughout 360° of rotation so that respective distances to the surface of workpiece 50 (as workpiece 50 is rotated on platform 210) detected by range sensor 110 accurately reflect any difference in the radius of the part.

Range sensor 110 is movably mounted with respect to precision rotary device 200 so that it can be disposed in a position with respect to workpiece 50 for the purpose of determining an integrated diameter value at a selected position on workpiece 50 (e.g., as illustrated in FIG. 1, for determining respective integrated diameter values along the length of the cone-shaped part). Alternatively, range sensor 110 is disposed in a fixed location along the length of axis of rotation 215 and workpiece 50 is adjusted to obtain diameter readings along the part by displacement of platform 210 axially with respect to the range sensor. Additionally, range sensor 110 is movably mounted so that it is disposed at a distance from the surface of workpiece 50 so that the surface of workpiece 50 is positioned within the depth of range of sensor 110.

By way of example, and not limitation, as shown in FIG. 1, range sensor 110 is disposed on a movable arm assembly 120 that is coupled to precision rotary device 200. Arm assembly 120 typically comprises a first axis arm 122 that is adjustable such that range sensor can be positioned at a selected distance offset from axis of rotation 215 at which the surface of the workpiece is within the depth of range of sensor 110. Such an arm is adjustable, for example, with the use of lockable telescoping sections or the like. Arm assembly 120 further typically comprises a second axis arm 124 that is coupled to first axis arm 122 and that is similarly adjustable so that range sensor 110 can be selectively positioned with respect to a position along axis of rotation 215 so as to provide measurements at a particular position on workpiece 50. By way of example and not limitation, range sensor is illustrated in a first position "A" so that it is disposed to sense a distance "D" to the surface of workpiece 50 disposed along orthogonal axial path 115. With appropriate adjustments on second axis arm 124 (e.g., by the use of telescoping sections) range sensor can be disposed in a position "B" (range sensor 110 being shown in phantom in this position in FIG. 1) along axis of rotation 215.

As range sensor 110 detects the distance between the sensor and the surface of workpiece 50 (the distance "D" being one representative distance illustrated in the Figure), sensor 110 typically is calibrated so that the ranging data generated can be processed to provide the workpiece radius "R" corresponding to distance "D" detected by sensor 110. In essence, such calibration provides an offset value corresponding to the distance between sensor 110 and axis of rotation 215; the detected distance between sensor and the surface of the workpiece thus enables system 100 to determine the radius value "R" of that portion of the workpiece, which data is processed as described below to provide the integrated diameter measurement and geometric shape analysis of the part.

For example, range sensor 110 is adapted to be calibrated by, for example, being positioned in a calibration position "B" such that range sensor 110 is disposed opposite to a calibration bar 230. Precision rotary device 200 typically comprises a plurality of calibration bars 230 (one representative bar being illustrated in the Figure) of different lengths (and that can be selectively disposed on platform 210). Use of a variety of calibration bars 230 of different lengths provides respective calibration information so that non-contact measurement system 100 can be used with workpieces having a wide range of diameters. Calibration bars 230 comprise a material having a low coefficient of thermal expansion in order to consistently provide an object of known length that can be placed on platform 210 and precisely centered (such as with the use of centering pin 212). The distance measurement between sensor 110 in position "B" and the end of calibration bar 230, denoted as distance "$D_{cal}$" in the Figure, when combined with the known length of bar 230 between its end and axis of rotation 215 (as the bar is centered over pin 212) provides a precise calibration measurement of the distance between sensor 110 and axis of rotation 215 for the selected position of first axis arm 122. Range sensor 110 thus calibrated can then be positioned by second axis arm 124 for the taking of measurement to determine respective radius values of workpiece 50 at various points along the longitudinal axis of workpiece 50 that corresponds with axis of rotation 215. Range sensor 110 typically comprises processing circuitry adapted to generate an output signal corresponding to the measured distance; such processing circuitry is readily further adapted to incorporate the distance between range sensor 110 and axis of rotation 215 calibration value $D_{cal}$ so as to generate a signal corresponding to respective radius values "R" of workpiece 50 as the workpiece is rotated through 360° (by action of precision rotary device 200) with respect to orthogonal axial path 115.

Workpiece measurement processor 150 is coupled to range sensor 110 to receive the distance signals generated by sensor 110 that correspond to the respective radius values of workpiece 50 as the workpiece is rotated by precision rotary device 200. Processor 150 is further coupled to receive rotational position signals from precision rotary device 200 that correspond to angular increments of rotation of platform 210. For one full rotation of workpiece 50 on platform 210 processor 150 thus receives a plurality of data sets of corresponding distance and rotational position signals (typically at least one respective signal for each degree of rotation, and commonly a respective signal for each one-tenth degree of rotation, with even more minute gradations being available).

These data sets are processed by a circuit in processor 150 (such as a microprocessor chip or the like) to determine an integrated diameter value as follows. The relationship of part diameter "D" (of a part having a circular geometric shape) to circumference is expressed as follows:

$$D = S/\pi \qquad (1)$$

wherein S is the circumference of the part. Part circumference can be expressed as:

$$S = \int R(\theta) d\theta \qquad (2)$$

Figure 2:
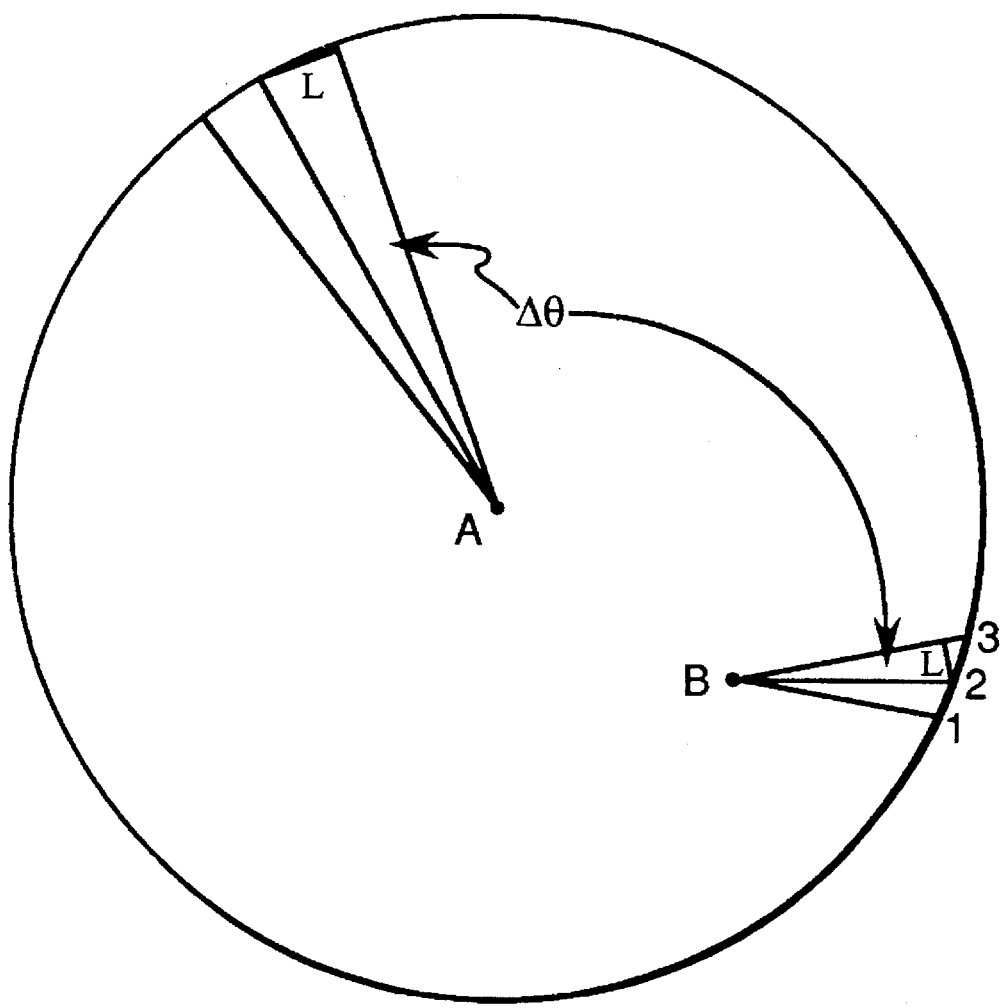
FIG. 2 is graphic representation of the circumference approximation of the measurement system of the present invention.

This latter expression can be approximated as follows:

$$S = \sum_i R_i \Delta\theta \qquad (3)$$

wherein $R_i$ is the respective radius value determined at an equiangular incremental rotation of workpiece 50. This relationship thus provides that the integrated diameter value $D_{int}$ is expressed as follows:

$$D_{int} = \sum_i (R_i \Delta\theta)/\pi \qquad (4)$$

in which "i" is the increment number of radius measurements made, $R_i$ represents the respective radius values for each incremental rotation of the workpiece, and $\Delta\theta$ is the equiangular increment of rotation of said platen between each respective radius measurement. As illustrated in FIG. 2, this approach is precise for workpieces centered on platform 210 so that the center of the part is aligned with axis of rotation 215, denoted by position "A" in FIG. 2.

In an alternative embodiment, processor 150 comprises a circuit that is further adapted to map the surface of workpiece 50 as it rotates through the generation of plurality of respective radius/rotational position (or angle) data sets so as to determine a part circumference value S from the sum of vectors constructed between sequential respective workpiece radius/angle data sets. Such a system is effective in determining a circumference value S of a part that is not rotating about its geometric center, e.g., a part that is misaligned on rotating platform 210 so that it is rotating about a point "B" as illustrated in FIG. 2, or alternatively, a part that is non-symmetric. In such a situation, processor 150 can generate an accurate value of circumference S from which the integrated diameter value $D_{int}$ can be determined.

The present invention is similarly readily able to determine an integrated diameter from measurement of less than 360° of rotation of the workpiece. For example, a semicircular part can be measured with system 100 in order to check the radius (or effective diameter) of the part.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A precision non-contact measurement system for determining an integrated diameter measurement of a curved workpiece positioned to rotate in correspondence with a precision rotary device about the axis of rotation of said rotary device, the system comprising:

a non-contact optical range sensor disposed along an orthogonal axial path with respect to the axis of rotation of said precision rotary device so as to illuminate said workpiece to optically determine a distance between said workpiece and said range sensor so as to determine a radius value of a portion of said workpiece disposed along said orthogonal axial path; and a workpiece measurement processor coupled to receive respective signals from said precision rotary device and said non-contact range sensor so as to correlate the rotational position of said workpiece with corresponding respective radius values sensed by said range sensor so as to determine the diameter of said workpiece.

2. The system of claim 1 wherein said non-contact range sensor comprises an optical distance sensor.

3. The system of claim 2 wherein said optical distance sensor is selected from the group consisting of laser range sensors and LED type sensors.

4. The system of claim 1 wherein said precision rotary device comprises a signal generator for generating a signal corresponding to the rotational position of said rotary device throughout 360° of rotation.

5. The system of claim 4 wherein said signal generator for said precision rotary device generates a workpiece position signal in equiangular increments of at least one-tenth degree.

6. The system of claim 4 further comprising said precision rotary device, said precision rotary device comprising a platen adapted to receive the workpiece to be measured, said platen having a center about which it rotates so as to rotate said workpiece with respect to said orthogonal axial path on which said non-contact range sensor is disposed.

7. The system of claim 6 wherein said precision rotary table further comprises a centering pin disposed in said platen center.

8. The system of claim 7 wherein said precision rotary table further comprises a removable calibration bar adapted to be positioned on said centering pin so as to provide a platen center reference value for said workpiece measurement processor.

9. The system of claim 4 wherein said precision rotary device comprises a machining apparatus adapted to receive said workpiece and so as to rotate said workpiece with respect to said orthogonal axial path on which said non-contact range sensor is disposed.

10. The system of claim 1 wherein said non-contact range sensor is adjustably disposed along said orthogonal axial path with respect to said precision rotary device, said range sensor being disposed at a position along said orthogonal axial path such that the surface of said workpiece to be detected by said range sensor is within the depth of field of said range sensor.

11. The system of claim 1 wherein said workpiece measurement processor comprises a circuit adapted for measurement of workpiece diameter in accordance with the following relation:

$$D_{int} = \left\{ \sum_i (R_i \Delta\theta) \right\} / \pi$$

in which $D_{int}$ is the integrated diameter measurement of the workpiece, "i" is the increment number of radius measurements made, $R_i$ represents the respective radius values for each incremental rotation of the workpiece, and $\Delta\theta$ is the equiangular increment of rotation of said platen between each respective radius measurement.

12. The system of claim 1 wherein said workpiece measurement processor comprises a circuit adapted for measurement of workpiece diameter corresponding to the sum of circumference vectors connecting respective sequential map points of said workpiece surface, said map points comprising a plurality of respective range/rotational position data sets.

13. The system of claim 1 wherein said range sensor is movably disposed with respect to said precision rotary device so as to be positionable in a range of positions along a length of the axis of rotation of said precision rotary device.

14. A precision non-contact measurement system for determining an integrated diameter measurement of a curved workpiece, the system comprising:

a precision rotary device having axis of rotation, said rotary device comprising a rotating member adapted to receive said workpiece so as to rotate said workpiece about said axis of rotation, said rotary device further comprising a signal generator for generating a signal corresponding to the rotational position of said rotating member;

a non-contact optical range sensor disposed along an orthogonal axial path with respect to said axis of rotation of said precision rotary device so as to determine a radius value of a portion of said workpiece disposed along said orthogonal axial path;

means for positioning said range sensor in a ranging position with respect to said workpiece, said ranging position being selectable with respect to the radial and axial position of said range sensor with respect to said workpiece; and a workpiece measurement processor coupled to receive respective signals from said precision rotary device and said non-contact range sensor so as to correlate the rotational position of said workpiece with corresponding respective radius values sensed by said range sensor and to determine an integrated diameter of said workpiece.

15. The system of claim 14 wherein said means for positioning comprises a movable coupling disposed between said range sensor and said rotary device, said movable coupling having a range of motion along both a first and a second axis such that said range sensor can be disposed within a first range of radial distances from said axis of rotation and further can be disposed within a range of axial positions along said axis of rotation.

16. The system of claim 14 wherein said means for positioning comprises an axially displaceable rotating member in said rotary device.

* * * * *